United States Patent
Ryu et al.

(10) Patent No.: US 9,123,050 B2
(45) Date of Patent: Sep. 1, 2015

(54) APPARATUS FOR PROVIDING CONTENT ACCORDING TO USER'S INTEREST IN CONTENT AND METHOD FOR PROVIDING CONTENT ACCORDING TO USER'S INTEREST IN CONTENT

(75) Inventors: Hee-seob Ryu, Suwon-si (KR); Sang-on Choi, Suwon-si (KR); Sung-jin Lee, Yongin-si (KR); Min-Woo Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 12/604,064

(22) Filed: Oct. 22, 2009

(65) Prior Publication Data
US 2010/0161409 A1 Jun. 24, 2010

(30) Foreign Application Priority Data
Dec. 23, 2008 (KR) ........................ 10-2008-0132191

(51) Int. Cl.
*G06Q 30/00* (2012.01)
*G06Q 30/02* (2012.01)
(52) U.S. Cl.
CPC ............ *G06Q 30/02* (2013.01); *G06Q 30/0244* (2013.01); *G06Q 30/0254* (2013.01)
(58) Field of Classification Search
None
See application file for complete search history.

(56) References Cited

U.S. PATENT DOCUMENTS

| 7,561,143 | B1* | 7/2009 | Milekic | 345/156 |
| 7,881,493 | B1* | 2/2011 | Edwards et al. | 382/103 |
| 2002/0060694 | A1* | 5/2002 | Matsui et al. | 345/733 |
| 2002/0103625 | A1* | 8/2002 | Card et al. | 702/187 |
| 2004/0167828 | A1* | 8/2004 | Bria et al. | 705/27 |
| 2005/0080671 | A1* | 4/2005 | Giraud et al. | 705/14 |
| 2005/0108092 | A1* | 5/2005 | Campbell et al. | 705/14 |
| 2006/0195468 | A1* | 8/2006 | Yanagi et al. | 707/102 |
| 2006/0256083 | A1* | 11/2006 | Rosenberg | 345/156 |
| 2007/0146637 | A1* | 6/2007 | Johnson et al. | 351/226 |
| 2007/0150916 | A1* | 6/2007 | Begole et al. | 725/10 |
| 2009/0006288 | A1* | 1/2009 | Yamamoto | 706/12 |
| 2009/0028434 | A1* | 1/2009 | Vanhoucke et al. | 382/182 |
| 2009/0112817 | A1* | 4/2009 | Jung et al. | 707/3 |
| 2009/0299857 | A1* | 12/2009 | Brubaker | 705/14.66 |
| 2010/0017260 | A1* | 1/2010 | Hamilton et al. | 705/10 |
| 2010/0039617 | A1* | 2/2010 | Martinez-Conde et al. | 351/209 |

FOREIGN PATENT DOCUMENTS

| EP | 1 349 391 A2 | 10/2003 |
| WO | 2006/040974 A1 | 4/2006 |
| WO | 2007/107949 A1 | 9/2007 |

OTHER PUBLICATIONS

Communication from the European Patent Office issued Dec. 3, 2013 in counterpart European Application No. 09175687.4.

(Continued)

*Primary Examiner* — Matthew T Sittner
(74) *Attorney, Agent, or Firm* — Sughrue Mion, PLLC

(57) ABSTRACT

An apparatus for providing content based on user's interest and a method for providing content based on user's interest are provided. The apparatus for providing content generates content differently according to the user's interest in content and outputs the generated content. Accordingly, more specialized content are provided to a user interested in the currently displayed content.

28 Claims, 5 Drawing Sheets

(56) References Cited

OTHER PUBLICATIONS

Communication dated Sep. 16, 2014, issued by the European Patent Office in counterpart European Application No. 09175687.4.

Communication issued on Feb. 27, 2015 by the European Patent Office in related Application No. 14193091.7.

* cited by examiner

APPARATUS FOR PROVIDING CONTENT ACCORDING TO USER'S INTEREST IN CONTENT AND METHOD FOR PROVIDING CONTENT ACCORDING TO USER'S INTEREST IN CONTENT

CROSS-REFERENCE TO RELATED APPLICATIONS

This application claims priority under 35 U.S.C. §119 from Korean Patent Application No. 10-2008-0132191, filed on Dec. 23, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to providing content, and more particularly, to providing content which enables a user to watch and listen to content such as an advertisement.

2. Description of the Related Art

Nowadays, people are living with a flood of advertisements. Although a lot of advertisement is provided, almost no advertisement is remembered, except for impressive advertisements.

However, as advertisement must be remembered to affect the consumer, it is very important to produce advertisements which provide a long-lasting impact on consumer's memory and thus advertisement providers and publicity departments of companies have made efforts to produce advertisements that are remembered.

Conventional advertisements are provided to unspecified individuals. That is, the same advertisement is provided to all users irrespective of their interest.

In this situation, the advertisement functions as unnecessary information to a user who is not interested in it, and provides uninteresting and insufficient information to a user who might be interested in it.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a method for providing content in which a user's interest is estimated and content such as advertisement is provided differently according to the estimated interest in order to provide specialized information to a user interested in the content and an apparatus for providing content using the method.

According to an exemplary aspect of the present invention, there is provided an apparatus for providing content, including an estimation unit which estimates user's interest in content; and a generation unit which generates the content differently according to the user's interest; and an output unit which outputs the content.

1) If a user is in an appropriate condition to view the content, the estimation unit may estimate the user's interest to be high; and 2) if a user is in an inappropriate condition to view the content, the estimation unit may estimate the user's interest to be low.

1) If the user is in the condition to give high attention to the content, the estimation unit may estimate the user's interest to be high; and 2) if the user is in the condition to give low attention to the content, the estimation unit may estimate the user's interest to be low.

The estimation unit may estimate the user's interest based on context information of the user, wherein the context information may include at least one of a user's location, moving direction, moving speed, eye direction, and gazing time toward the content.

The estimation unit may estimate the user's interest to be high, if at least one condition is satisfied from among the conditions: 1) where the user's location is in an area adjacent to the display on which the content is output, 2) where the user's moving direction is towards the display, 3) where the user's moving speed is less than a predetermined speed, 4) where the user's eye direction is toward the content, and 5) where the user's gazing time toward the content is equal to or longer than a predetermined time.

The estimation unit may estimate the user's interest to be low, if at least one condition is satisfied from among the conditions: 1) where the user's location is not in an area adjacent to the display on which the content is output, 2) where the user's moving direction is not towards the display, 3) where the user's moving speed is equal to or faster than a predetermined speed, 4) where the user's eye direction is not toward the content, and 5) where the user's gazing time toward the content is shorter than a predetermined time.

The generation unit may generate content more specialized to the user if the user's interest is high.

1) If the user's interest corresponds to a first level, the generation unit may generate content targeting the user and people around the user; and 2) if the user's interest is equal to or higher than a second level, the generation unit may generate content targeting the user, wherein the second level indicates that the user's interest is higher than that in the first level.

1) If the user's interest corresponds to a first level, the generation unit may generate content including background music; and 2) if the user's interest is equal to or higher than a second level, the generation unit may generate content including a voice, wherein the second level indicates that the user's interest is higher than that in the first level.

1) If the user's interest corresponds to a second level, the generation unit may determine details of the content based on first information of the user and generate the details, and 2) if the user's interest corresponds to a third level, the generation unit may determine detail of the content based on the first and second information of the user and generate the detail, wherein the third level indicates that the user's interest is higher than that in the second level.

The first and second information may represent information regarding the user.

The information regarding the user may include at least one of height, gender, and age.

If the user's interest is high, the generation unit may generate the content in an output manner highly specialized to the user.

1) If the user's interest corresponds to the first level, the generation unit may generate the content in an output manner targeting the user and people adjacent to the user, and 2) if the user's interest is equal to or higher than the second level, the generation unit may generate the content in an output manner targeting the user, wherein the second level indicates that the user's interest is higher that that in the first level.

1) If the user's interest corresponds to the first level, the generation unit may generate the content in an output manner not tracking the user; and 2) if the user's interest is equal to or higher than the second level, the generation unit may generate the content in an output manner tracking the user, wherein the second level indicates that the user's interest is higher that that in the first level.

1) If the user's interest corresponds to the second level, the generation unit may determine an output manner of the content based on the first information of the user; and 2) if the user's interest corresponds to the third level, the generation unit may determine an output manner of the content based on the first and second information of the user, wherein the third level indicates that the user's interest is higher that that in the second level.

The first and second information may represent information regarding the user.

The information regarding the user may include at least one of height, gender, and age.

The content may include advertisements.

According to another exemplary aspect of the present invention, there is provided an apparatus for providing content, including a display which outputs content; an estimation unit which estimates user's interest in the display; and a generation unit which generates the content differently according to the user's interest.

According to another exemplary aspect of the present invention, there is provided a method for providing content, including estimating user's interest in content; and generating the content differently according to the user's interest and outputting the generated content.

The operation of estimating may include 1) if a user is in an appropriate condition to view the content, estimating the user's interest to be high: and 2) if a user is in an inappropriate condition to view the content, estimating the user's interest to be low.

The operation of estimating may include 1) if the user is in the condition to give high attention to the content, estimating the user's interest to be high; and 2) if the user is in the condition to give low attention to the content, estimating the user's interest to be low.

The operation of estimating may estimate the user's interest based on context information regarding the user, wherein the context information comprises at least one of user's direction, moving direction, moving speed, eye direction, and gazing time toward the content.

If the user's interest is high, the operation of outputting may output content more specialized to the user.

The operation of outputting may output the content in an output manner more specialized to the user if the user's interest is high.

The content may include advertisement content.

According to another exemplary aspect of the present invention, there is provided a method for providing content, including estimating user's interest in a display; and generating content displayed on the display differently according to the user's interest, and outputting the generated content.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
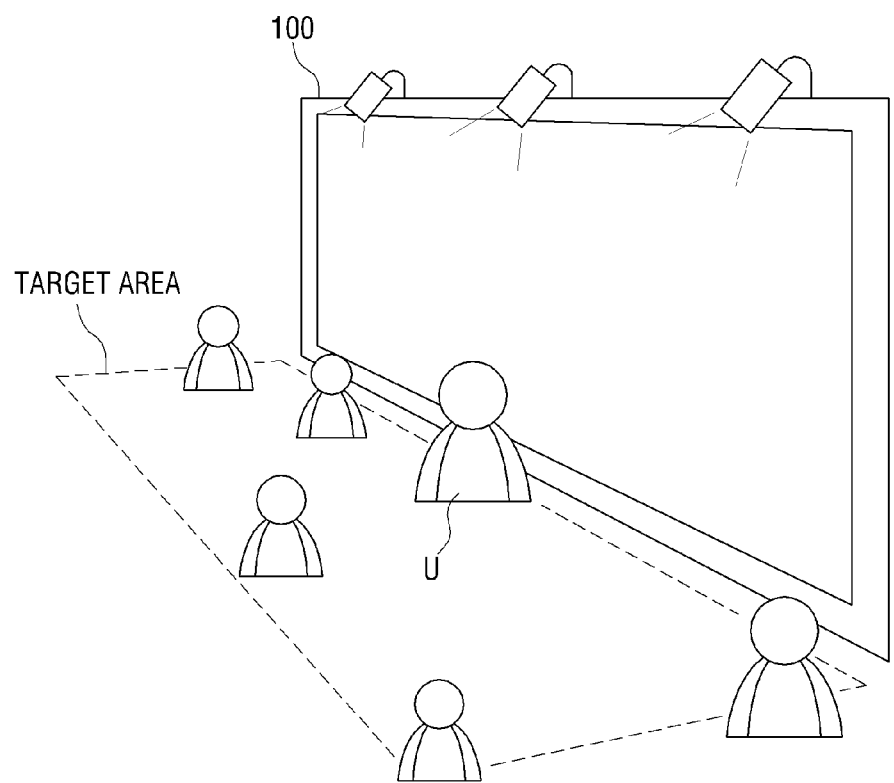
FIG. 1 is a view provided to explain an apparatus for providing interactive advertisement according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a view provided to explain an apparatus for providing interactive advertisement according to an exemplary embodiment of the present invention. An interactive advertisement providing apparatus 100 according to an exemplary embodiment of the present invention provides a target audience (Hereinbelow, referred to as a user) with the interactive advertisement.

Interactive advertisement refers to an advertisement which is changed in its content and output manner according to a user's interest. Specifically, if a user is highly interested in a specific advertisement, an advertisement specialized for the user is output in an output manner specialized for the user.

Referring to FIG. 1, the interactive advertisement providing apparatus 100 includes a display, and cameras having microphones are attached to the upper portion of the display. These cameras photograph a target area and circumferential areas. The videos photographed by the cameras are used to recognize the user's interest.

The display outputs an interactive advertisement. The interactive advertisement may be displayed on an entire area or an area of the display. If the interactive advertisement is displayed on an area of the display, a background image may be displayed on the other area.

Figure 2:
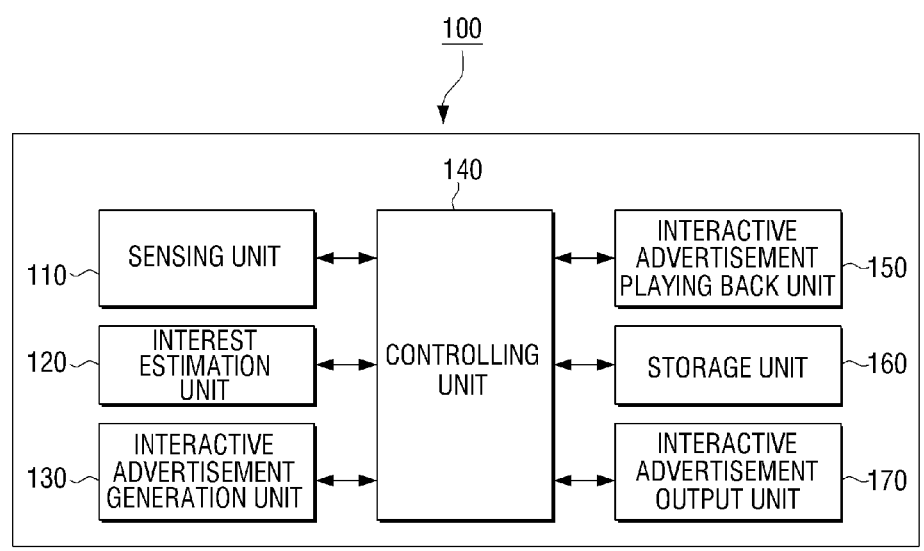
FIG. 2 is a block diagram of an apparatus for providing the interactive advertisement illustrated in FIG. 1.

Hereinbelow, the interactive advertisement providing apparatus 100 according to an exemplary embodiment of the present invention will be explained with reference to FIG. 2. FIG. 2 is a detailed block diagram of the interactive advertisement providing apparatus 100 illustrated in FIG. 1.

Referring to FIG. 2, the interactive advertisement providing apparatus 100 comprises a sensing unit 110, an interest estimation unit 120, an interactive advertisement generation unit 130, a controlling unit 140, an interactive advertisement playing back unit 150, a storage unit 160, and an interactive advertisement output unit 170.

The sensing unit 110 photographs a target area and circumferential areas, and the cameras having a microphone illustrated in FIG. 1 correspond to the sensing unit 110. A video photographed by the sensing unit 110 is transmitted to the interest estimation unit 120 through the controlling unit 140.

The interest estimation unit 120 tracks a user on a video photographed by the sensing unit 110. The interest estimation unit 120 estimates user's interest regarding the interactive advertisement.

Specifically, the interest estimation unit 120 estimates the interest to be high 1) if a user is in an appropriate condition to watch the interactive advertisement, and the interest estimation unit 120 estimates the interest to be low 2) if a user is in an inappropriate condition to watch the interactive advertisement.

In other words, 1) if a user gives high attention to the interactive advertisement, the interest estimation unit 120 estimates the interest to be high, and 2) if a user gives low attention to the interactive advertisement, the interest estimation unit 120 estimates the interest to be low.

The method of the interest estimation unit 120 for estimating the interest is illustrated in detail in FIG. 3, and thus the detailed description will be explained later with reference to FIG. 3.

The interactive advertisement generation unit 130 generates interactive advertisement based on the user's interest estimated by the interest estimation unit 120.

Specifically, if the user's interest is high, the interactive advertisement generation unit 130 generates interactive advertisement of content highly specialized to the user. If the user's interest is high, the interactive advertisement generation unit 130 generates interactive advertisement in an output manner highly specialized in the user.

The method of the interactive advertisement generation unit 130 for generating the interactive advertisement is specifically illustrated in FIG. 4, and thus the detailed description will be explained with reference to FIG. 4.

The interactive advertisement playing back unit 150 plays back interactive advertisement generated by the interactive advertisement generation unit 130 and transmits the played back interactive advertisement to the interactive advertisement output unit 170 through the controlling unit 140.

The interactive advertisement output unit 170 outputs the interactive advertisement played back by the interactive advertisement playing back unit 150 to a display and an audio output apparatus.

The display may be implemented using a flat panel display (FPD) such as a liquid crystal display (LCD) and plasma display panel (PDP), and a projection display, and the audio output apparatus may be implemented using a speaker.

A display capable of outputting three dimensional (3D) video may be used in addition to a display capable of outputting two dimensional (2D) video.

A single display may be used or a plurality of displays may also be used in an integrated form. The speaker may also be implemented by combining a plurality of speakers. The plurality of speakers may have different types. For example, a general speaker and a directional speaker may be combined.

The storage unit 160 provides a memory to store programs and data required to operate interactive advertisement providing apparatus 100 according to an exemplary embodiment of the present invention. Specifically, the storage unit 160 stores 1) the process of FIG. 3 that the interest estimation unit 120 uses to estimate the user's interest, and 2) the process of FIG. 4 that the interactive advertisement generation unit 130 uses to generate the interactive advertisement.

Figure 3:
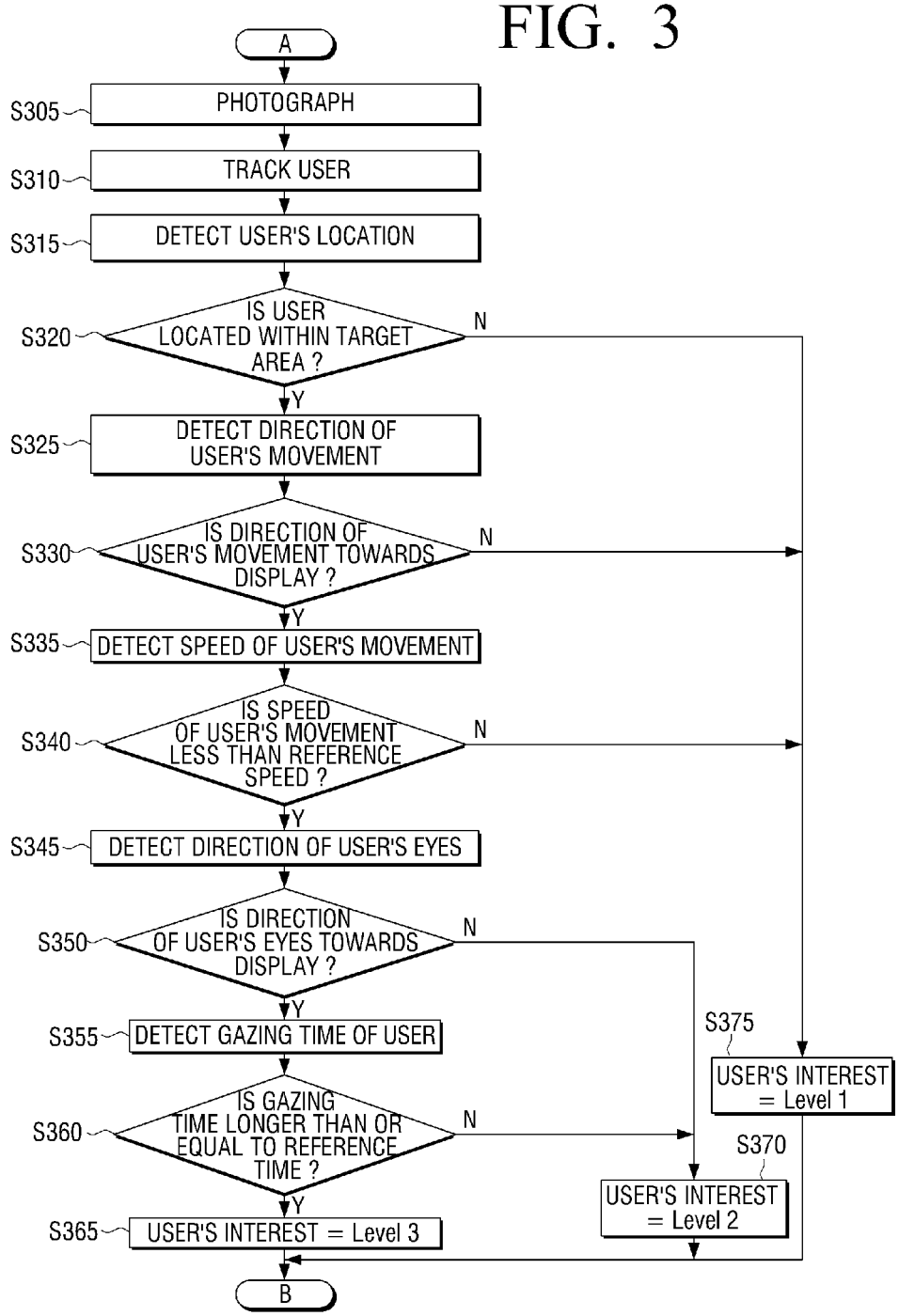
FIG. 3 is a flowchart provided to explain the process of estimating user's interest.
Figure 4:
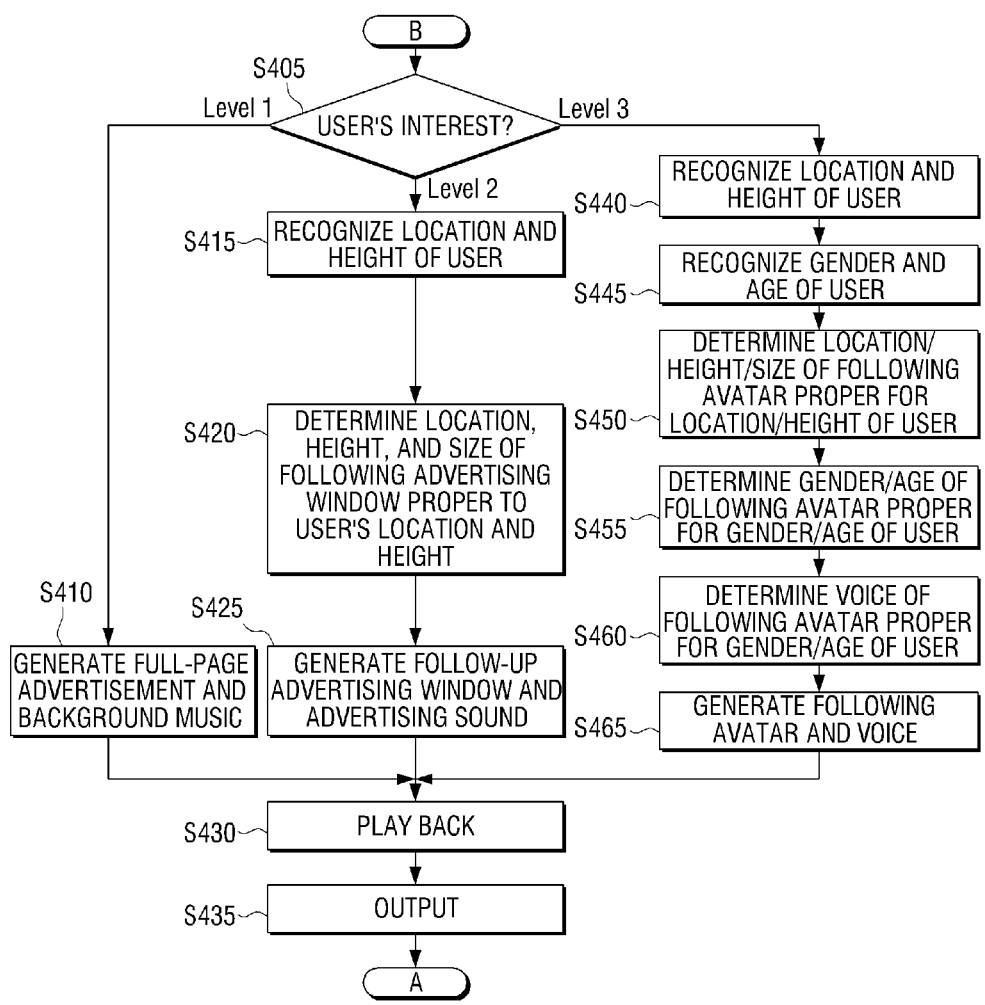
FIG. 4 is a flowchart provided to explain the process of playing back and outputting different interactive advertisement according to user's interest estimated through the process of FIG. 3.

Accordingly, 1) the interest estimation unit 120 uses the process of FIG. 3 stored in the storage unit 160 to estimate the interest, and 2) the interest advertisement generation unit 130 uses the process of FIG. 4 stored in the storage unit 160 to generate the interactive advertisement.

The controlling unit 140 controls the input and output of data among elements provided in the interactive advertisement providing apparatus 100 according to an exemplary embodiment of the present invention.

The controlling unit 140 controls 1) the video photographed by the sensing unit 110 to be transmitted to the interest estimation unit 120 and the interactive advertisement generation unit 130, 2) the user's interest estimated by the interest estimation unit 120 to be transmitted to the interactive advertisement generation unit 130, 3) the interactive advertisement generated by the interactive advertising generation unit 130 to be transmitted to the interactive advertisement playing back unit 150, and 4) the interactive advertisement played back by the interactive advertisement playing back unit 150 to be transmitted to the interactive advertisement output unit 170.

Hereinbelow, the process in which the interactive advertisement providing apparatus 100 provides a user with the interactive advertisement will be explained in detail with reference to FIGS. 3 and 4.

The process of estimating the user's interest will be explained in detail with reference to FIG. 3. FIG. 3 is a flowchart provided to explain the process of estimating the user's interest.

The sensing unit 110 photographs a target area and circumferential areas, and transmits the photographed video to the interest estimation unit 120 through the controlling unit 140 (S305). The interest estimation unit 120 tracks a user on the photographed video transmitted in operation S305 (S310).

The user is referred to as a target audience to which the interactive advertisement is provided. The process of tracking a user represents the process of continuously looking for a user on the filmed videos which are continuously input.

The interest estimation unit 120 detects user's location from the photographed video (S315). The process of detecting the user's location in operation S315 depends on the process of recognizing the location of the user tracked in operation S310.

If it is determined that the user's location detected in operation S315 is within a target area, that is if a user is located adjacent to the display on which the interactive advertisement is output (S320-Y), the interest estimation unit 120 detects the direction of user's movement from the photographed video (S325).

The process of detecting the direction of user's movement in operation S325 may be performed using a direction of motion vector for the user, which is calculated by comparing the previously photographed video with the currently photographed video.

If it is determined that the direction of user's movement detected in operation S325 is towards the display (S330-Y), the interest estimation unit 120 detects the speed of user's movement from the photographed video (S335).

The process of detecting the speed of user's movement in operation S335 may be performed using the magnitude of a motion vector for the user, which is calculated by comparing the previously photographed video with the currently photographed video.

If the speed of user's movement detected in operation S335 is less than a reference speed (S340-Y), the interest estimation unit 120 detects the direction of user's eyes from the photographed video (S345).

The direction of user's eyes in operation S345 may be detected by recognizing the degree of the user's head rotation and the position of the pupil of the eyes on the photographed video.

If it is determined that the direction of user's eyes detected in operation S345 is towards the display in operation (S350-Y), the interest estimation unit 120 detects the gazing time of the user from the photographed video (S355).

The process of detecting the gazing time of the user in operation S355 may be detected by recognizing the time during which the direction of user's eyes detected in operation S345 is maintained on the photographed video which is being input in real-time.

If it is determined that the gazing time detected in operation S355 is longer than or equal to a reference time (S360-Y), the interest estimation unit 120 estimates the user's interest to be Level 3 (S365).

Level 3 corresponds to the case that the user's interest on the interactive advertisement is high.

If a user is located within a target area (S320-Y), the direction of user's movement is towards the display (S330-Y), and the speed of user's movement is less than a reference speed (S340-Y), but if either i) the direction of user's eyes is not towards the display (S350-N), or ii) the gazing time is shorter than a reference time (S360-N), the interest estimation unit 120 estimates the user's interest to be Level 2 (S370).

Level 2 corresponds to the case that the user's interest on the interactive advertisement is medium.

If i) a user is located outside the target area (S320-N), ii) the direction of user's movement is not towards the display (S330-N), or iii) the speed of user's movement is faster than or equal to a reference speed (S340-N), the interest estimation unit 120 estimates the user's interest to be Level 1 (S375).

Level 1 corresponds to the case that the user's interest on the interactive advertisement is low.

Hereinbelow, the process of playing back and outputting different types of interactive advertisement according to the user's interest which is estimated through the process of FIG. 3 will be explained in detail with reference to FIG. 4.

If the user's interest corresponds to Level 1 (S405→Level 1), the interactive advertisement generation unit 130 generates a full-page advertisement and background music (S410). The interactive advertisement playing back unit 150 plays back the advertisement having the full-page advertisement and background music generated in operation S410 (S430), and the interactive advertisement output unit 170 outputs the advertisement played back in operation S430 (S435).

The full-page advertisement is displayed on the entire display and the background music is output through a general speaker so that general people including a user and other people watch the interactive advertisement.

The interactive advertisement generated in operation S410 may be generated according to the output manner targeting general people. The content of the full-page advertisement and background music target general people whose interest is low.

As Level 1 corresponds the case that the user's interest is low, the interactive advertisement generated in operation S410 is implemented as an advertisement to attract an interest from general people including a user.

If the estimated user's interest corresponds to Level 2 (S405→Level 2), the interactive advertisement generation unit 130 recognizes the location and height of the user (S415). The location and height of the user in operation S415 may be recognized by analyzing the photographed video.

The interactive advertisement generation unit 130 determines the location, height, and size of a following advertising window to correspond to the user's location and height (S420).

The interactive advertisement generation unit 130 generates a follow-up advertising window and an advertising sound according to the determined location, height, and size (S425). The interactive advertisement playing back unit 150 plays back an interactive advertisement including the following advertising window and the advertising sound generated in operation S425 (S430), and the interactive advertisement output unit 170 outputs the interactive advertisement played back in operation S430 (S435).

The following advertising window is an advertising window on which an interactive advertisement having the appropriate location and size to be shown to a user is displayed, and tracks a user. That is, the location and size of the following advertising window may be changed in real-time according to the user's location. For example, if a user moves from left to right, the location of the following advertising window also moves from left to right. If a user moves close to the display, the size of the following advertising window is gradually reduced.

The advertising sound is output through a directional speaker so that a user more clearly hears the sound.

The interactive advertisement generated in operation S425 may be generated according to the output manner which targets a user.

The following advertising window generated in operation S425 includes more specific content than that of the full-page advertisement generated in operation S410. The content regarding the interactive advertisement are output as a voice so that a user hears the content in operation S425.

The interactive advertisement generated in operation S425 targets a specific user, and is more specialized for a specific user than the general advertisement generated in operation S410 because Level 2 indicates that the user's interest is higher than in Level 1.

If the estimated interest corresponds to Level 3 (S405→Level 3), the interactive advertisement generation unit 130 recognizes the gender and age of a user together with the location and height of the user (S440, S445). The location, height, gender, and age of the user may be recognized by analyzing the photographed video in operations S440 and S445.

The interactive advertisement generation unit 130 determines the location, height, and size of a following avatar appropriate for the recognized user's location and height, and determines the gender and age of the following avatar to be appropriate for the recognized user's gender and age (S450, S455).

The interactive advertisement generation unit 130 determines a voice of a following avatar to be appropriate for the recognized user's gender and age (S460).

The interactive advertisement generation unit 130 generates a following advertising widow and an advertising sound reflecting the information determined in operations S450 to S460 (S425). The interactive advertisement playing back unit 150 plays back the interactive advertisement having the following advertising window and the advertising sound generated in operation S425 (S430), and the interactive advertisement output unit 170 outputs the advertisement played back in operation S430 (S435).

The following avatar is a graphic representing an advertising model having appropriate location and size to be shown to a user. Information regarding a target advertisement may be displayed adjacent to the following avatar.

The location and size of the following avatar may be changed in real-time according to the user's location. For example, if a user moves from left to right, the location of the following advertising window may also move from left to right. If a user gradually moves close to the display, the size of the following advertising window may gradually decrease.

The appearance and voice of a following avatar may be changed according to the user's gender and age. For example, if a user is a middle-aged man, the gender, age, and voice of the following avatar are determined to be the gender, age, and voice which the middle-aged man favors. If a user is a female student, the gender, age, and voice of a following avatar are determined to be the gender, age, and voice which the female student favors.

The voice of the following avatar is output through a directional speaker so that a user more clearly hears the following avatar's voice.

The interactive advertisement generated in operation S465 may be generated according to the output manner targeting a user. The advertising information generated with a following avatar includes more specific information than that of the following advertising window generated in operation S425.

Level 3 corresponds to the case that the user's interest is higher than in Level 2. The interactive advertisement generated in operation S465 may be more specialized to a user than the interactive advertisement generated in operation S425.

Figure 5:
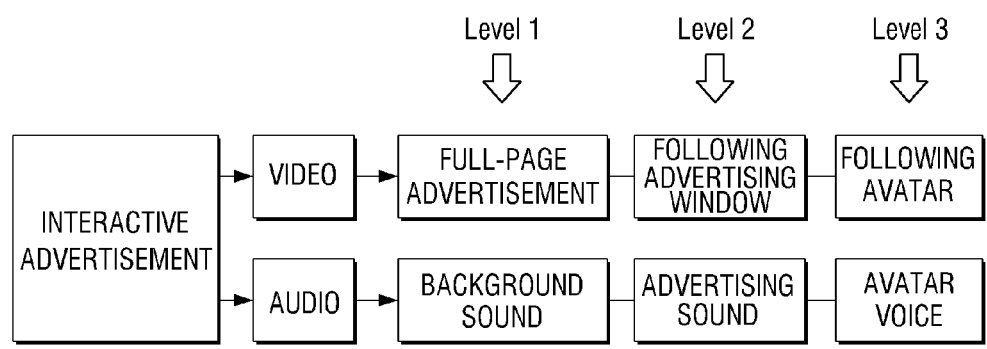
FIG. 5 is a view illustrating the structure of an interactive advertisement.

FIG. 5 illustrates the structure of interactive advertisement which is explained above. Referring to FIG. 5, the interactive advertisement includes video and audio, and the content differs according to the user's interest.

Referring to FIG. 5, 1) if the user's interest corresponds to Level 1, the advertisement having a full-page advertisement and a background music is provided to a user, 2) if the user's interest corresponds to Level 2, the interactive advertisement having a following advertising window and advertising sound is provided to a user, and 3) if the user's interest corresponds to Level 3, the interactive advertisement having a following avatar and voice is provided to a user.

The process of recognizing the user's interest and differently displaying the interactive advertisement content and the output manner according to the recognized user's interest are described in detail with reference to exemplary embodiments of the present invention.

While the content and output manner of the interactive advertisement are differently displayed according to the user's interest in this exemplary embodiment of the present invention, this is merely an exemplary embodiment of the present invention for convenience of description. Accordingly, only one of the information and output manner of the interactive advertisement may be differently displayed according to the user's interest. In addition, other features besides the content and output manner of the interactive advertisement may be changed according to the user's interest.

According to the exemplary embodiment of the present invention, the user's interest is estimated based on context information such as the user's location, the direction of user movement, the speed of user movement, the direction of user's eyes, and the gazing time. However, as the above-mentioned context information is merely exemplary, other context information may be applied to the exemplary embodiment of the present invention.

The user's interest is divided into three levels in this exemplary embodiment of the present invention, but this is merely an exemplary embodiment of the present invention for convenience of description. The user's interest may be divided into two levels or four or more levels.

The content and output manner of the interactive advertisement which are differently displayed according to each level are merely an exemplary embodiment for the convenience of description. The information and output manner of the interactive advertisement may be changed as occasion demands.

The user's height, gender, and age are used to determine the output manner of the interactive advertisement, but this is merely an exemplary embodiment of the present invention for convenience of description. Accordingly, the output manner of the interactive advertisement may be determined using user's other personal information in addition to the above information.

The interactive advertisement provided to a user is an example of content. Accordingly, the technical idea of the present invention may be applied to other content besides the advertisement content.

The degree of the user's interest regarding the interactive advertisement displayed on the display is recognized in this exemplary embodiment of the present invention, but this is also an exemplary embodiment of the present invention.

The interactive advertisement may be differently output on the display according to the user's interest in the display other than the interactive advertisement. Accordingly, if a user is interested in a display on which the interactive advertisement is not displayed, the interactive advertisement may be displayed on the display, and may also be displayed differently according to the user's interest.

While the interactive advertisement is performed for only one user in this exemplary embodiment of the present invention, this is an exemplary embodiment of the present invention. If a large-sized display is used, the interactive advertisement may be partially performed for a plurality of users at the same time.

As described above, according to an exemplary embodiment of the present invention, more specialized content may be provided to the user who is interested in the current content.

The interactive advertisement having the features of the present invention is effective for an advertisement provider and a user in that more specific and interesting advertisement is provided to the user interested in the advertisement.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An apparatus for providing content, comprising:
a display which displays a content;
a sensing unit which photographs a target area including a user;
an estimation unit which estimates a user's interest regarding content displayed on the display by tracking the user included in the photographed target area; and
a generation unit which generates the content differently according to the user's interest; and
an output unit which outputs the generated content to the display,
wherein the generation unit generates a tracking advertisement which has a location, a size, and a height which is based on a location and a height of the user, when the interest level of the user is at a first level, and generates a following avatar which has a location, a size, a gender, an age, and a voice which is based on the location, a gender, and an age of the user, when the interest level of the user is at a second level which is greater than the first level, and
wherein the first level is greater than a level of interest of an ordinary user but smaller than the second level.

2. The apparatus as claimed in claim 1, wherein
1) if the user is in an appropriate condition to view the content, the estimation unit estimates the user's interest to be high; and 2) if the user is in an inappropriate condition to view the content, the estimation unit estimates the user's interest to be low.

3. The apparatus as claimed in claim 1, wherein
1) if the user is in a condition to give high attention to the content, the estimation unit estimates the user's interest to be high; and
2) if the user is in a condition to give low attention to the content, the estimation unit estimates the user's interest to be low.

4. The apparatus as claimed in claim 1, wherein the estimation unit estimates the user's interest based on context information of the user,
wherein the context information comprises at least one of user's location, moving direction, moving speed, eye direction, and gazing time toward the content.

5. The apparatus as claimed in claim 4, wherein the estimation unit estimates the user's interest to be high, if at least one condition is satisfied from among the conditions:
1) where the user's location is in an area adjacent to the display on which the content is output,
2) where the user's moving direction is towards the display,
3) where the user's moving speed is less than a predetermined speed,
4) where the user's eye direction is toward the content, and
5) where the user's gazing time toward the content is equal to or longer than a predetermined time.

6. The apparatus as claimed in claim 4, wherein the estimation unit estimates the user's interest to be low, if at least one condition is satisfied from among the conditions:
1) where the user's location is not in an area adjacent to the display on which the content is output,
2) where the user's moving direction is not towards the display,
3) where the user's moving speed is equal to or faster than a predetermined speed,
4) where the user's eye direction is not toward the content, and
5) where the user's gazing time toward the content is shorter than a predetermined time.

7. The apparatus as claimed in claim 1, wherein the generation unit generates content more specialized to the user if the user's interest is high.

8. The apparatus as claimed in claim 1, wherein
1) if the user's interest corresponds to a first level, the generation unit generates content targeting the user and people around the user; and
2) if the user's interest is equal to or higher than a second level, the generation unit generates content targeting the user,
wherein the second level indicates that the user's interest is higher than that in the first level.

9. The apparatus as claimed in claim 7, wherein
1) if the user's interest corresponds to a first level, the generation unit generates content comprising background music; and
2) if the user's interest is equal to or higher than a second level, the generation unit generates content comprising a voice,
wherein the second level indicates that the user's interest is higher than that in the first level.

10. The apparatus as claimed in claim 7, wherein
1) if the user's interest corresponds to a second level, the generation unit determines detail of the content based on first information of the user and generates the detail, and
2) if the user's interest corresponds to a third level, the generation unit determines detail of the content based on the first information and second information of the user and generates the detail,
wherein the third level indicates that the user's interest is higher that that in the second level.

11. The apparatus as claimed in claim 10, wherein the first and second information represents information regarding the user.

12. The apparatus as claimed in claim 11, wherein the information regarding the user comprises at least one of height, gender, and age.

13. The apparatus as claimed in claim 1, wherein if the user's interest is high, the generation unit generates the content in an output manner highly specialized to the user.

14. The apparatus as claimed in claim 13, wherein
1) if the user's interest corresponds to a first level, the generation unit generates the content in an output manner targeting the user and people adjacent to the user, and
2) if the user's interest is equal to or higher than a second level, the generation unit generates the content in an output manner targeting the user,
wherein the second level indicates that the user's interest is higher than that in the first level.

15. The apparatus as claimed in claim 13, wherein
1) if the user's interest corresponds to a first level, the generation unit generates the content in an output manner not tracking the user; and
2) if the user's interest is equal to or higher than a second level, the generation unit generates the content in an output manner tracking the user, wherein the second level indicates that the user's interest is higher than that in the first level.

16. The apparatus as claimed in claim 13, wherein
1) if the user's interest corresponds to a second level, the generation unit determines an output manner of the content based on first information of the user; and 2) if the user's interest corresponds to a third level, the generation unit determines an output manner of the content based on the first information and second information of the user,
wherein the third level indicates that the user's interest is higher than that in the second level.

17. The apparatus as claimed in claim 16, wherein the first and second information represents information regarding the user.

18. The apparatus as claimed claim 17, wherein the information regarding the user comprises at least one of height, gender, and age.

19. The apparatus as claimed in claim 1, wherein the content comprises an advertisement.

20. An apparatus for providing content, comprising:
a display which displays content;
a sensing unit which photographs a target area including a user;
an estimation unit which estimates a user's interest regarding content displayed on the display by tracking the user included in the photographed target area; and
a generation unit which generates the content differently according to the user's interest,
wherein the generation unit generates a tracking advertisement which has a location, a size, and a height which is based on a location and a height of the user, when the interest level of the user is at a first level, and generates a following avatar which has a location, a size, a gender, an age, and a voice which is based on the location, a gender, and an age of the user, when the interest level of the user is at a second level which is greater than the first level, and wherein the first level is greater than a level of interest of an ordinary user but smaller than the second level.

21. A method for providing content, comprising:
displaying a content on a display;
photographing a target area including a user;
estimating, by an interactive advertisement providing apparatus, a user's interest regarding the displayed content by tracking the user included in the photographed target area; and
  generating the content differently according to the user's interest and outputting the generated content to the display,
  wherein the generating the content generates a tracking advertisement which has a location, a size, and a height which is based on a location and a height of the user, when the interest level of the user is at a first level, and generates a following avatar which has a location, a size, a gender, an age, and a voice which is based on the location, a gender, and an age of the user, when the interest level of the user is at a second level which is greater than the first level, and
  wherein the first level is greater than a level of interest of an ordinary user but smaller than the second level.

22. The method as claimed in claim 21, wherein the operation of estimating comprises:
  1) if the user is in an appropriate condition to view the content, estimating the user's interest to be high: and
  2) if the user is in an inappropriate condition to view the content, estimating the user's interest to be low.

23. The method as claimed in claim 21, wherein the operation of estimating comprises:
  1) if the user is in a condition to give high attention to the content, estimating the user's interest to be high; and
  2) if the user is in a condition to give low attention to the content, estimating the user's interest to be low.

24. The method as claimed in claim 21, wherein the operation of estimating estimates the user's interest based on context information regarding the user,
  wherein the context information comprises at least one of the user's direction, moving direction, moving speed, eye direction, and gazing time toward the content.

25. The method as claimed in claim 21, wherein if the user's interest is high, the operation of outputting outputs content more specialized to the user.

26. The method as claimed in claim 21, wherein the operation of outputting outputs the content in an output manner more specialized to the user if the user's interest is high.

27. The method as claimed in claim 21, wherein the content comprise advertisement content.

28. A method for providing content, comprising:
displaying a content in a display;
photographing a target area including the user;
estimating a user's interest regarding the displayed content by tracking the user included in the photographed target area; and
generating the content displayed on the display differently according to the user's interest, and outputting the generated content to the display,
wherein the generating the content generates a tracking advertisement which has a location, a size, and a height which is based on a location and a height of the user, when the interest level of the user is at a first level, and generates a following avatar which has a location, a size, a gender, an age, and a voice which is based on the location, a gender, and an age of the user, when the interest level of the user is at a second level which is greater than the first level, and
wherein the first level is greater than a level of interest of an ordinary user but smaller than the second level.

\* \* \* \* \*